United States Patent [19]

Gill

[11] 4,020,933

[45] May 3, 1977

[54] FLUID OPERATED CLUTCH WITH DUAL PISTONS

[75] Inventor: Raymond E. Gill, Clearwater, Fla.

[73] Assignee: Westinghouse Air Brake Company, Pittsburgh, Pa.

[22] Filed: Aug. 28, 1975

[21] Appl. No.: 608,629

[52] U.S. Cl. .............................. 192/86; 192/109 F
[51] Int. Cl.² ....................................... F16D 25/063
[58] Field of Search ......... 192/87.17, 85 AA, 88 A, 192/109 F, 86

[56] References Cited

UNITED STATES PATENTS

| | | | |
|---|---|---|---|
| 2,916,122 | 12/1959 | Hindmarch | 192/109 X |
| 3,306,408 | 2/1967 | Kahle | 192/109 X |
| 3,384,214 | 5/1968 | Wilson | 192/109 F |
| 3,612,237 | 10/1971 | Honda | 192/109 X |
| 3,746,138 | 7/1973 | Forster | 192/109 F |

Primary Examiner—Benjamin W. Wyche
Attorney, Agent, or Firm—Leydig, Voit, Osann, Mayer & Holt, Ltd.

[57] ABSTRACT

A fluid pressure actuated friction clutch assembly includes rotatable driving and driven members adapted to be coupled frictionally together by a clutch pack as the pack is compressed by two pistons movable between advanced and retracted positions relative to the driving member. The pistons are moved between their advanced and retracted positions by a non-compressible pressure fluid as the latter is filled and emptied from a main chamber located behind the pistons. Secondary chambers containing pressure fluid urge the pistons toward their retracted positions with one of the pistons being urged rearwardly with a greater force than the other. Accordingly, as the main chamber is filled, the other piston advances to engage and partially compress the clutch pack before the one piston engages the clutch pack to fully compress the clutch pack and thereby complete clutch engagement. During clutch engagement, the movable wall of the chamber as defined by the two pistons prevents the fluid from flowing out of the chamber as the chamber is being filled.

4 Claims, 3 Drawing Figures 4,020,933

FLUID OPERATED CLUTCH WITH DUAL PISTONS

BACKGROUND OF THE INVENTION

The present invention relates generally to a fluid pressure actuated clutch and, more particularly, to a clutch of the type including a clutch plate having inner and outer pistons movable into engagement with a clutch pack to compress the pack and thereby engage the clutch. To move the pistons, a chamber located behind the pistons is filled with pressurized fluid. First and second spring means of different strengths urge the pistons rearwardly away from engagement with the clutch pack. Accordingly, when filling the chamber, one of the pistons slides forwardly with respect to the other and engages the clutch pack to partially compress the pack before the other piston engages it to complete engagement of the clutch. To disengage the clutch, the pressurized fluid is vented from the chamber and the first and second spring means urge the pistons out of engagment with the clutch pack.

A clutch of the foregoing type is disclosed in U.S. Pat. No. 3,612,237.

SUMMARY OF THE INVENTION

The primay object of the present invention is to provide a new and improved fluid pressure actuated clutch assembly in which the transition from clutch disengagement to engagement is completed smoothly, and without imparting shock to the driveline connected with the clutch and regardless of variations in the viscosity or other operating characteristics of the actuating fluid so that smooth shifting is achieved with the exemplary clutch over a much wider range of operating conditions than was possible heretofore with prior similar clutches.

A more detailed object is to achieve the foregoing by staging the application of the clutch engagment force from a partial force to a full force without metering or trimming the flow of the actuating fluid so that, in the first stage, application of the partial force causes driving slippage of the clutch and, in the last stage, application of the full force completes engagement of the clutch without imparting shock to the driveline.

The invention also resides in the novel construction of the clutch and, particularly, in the construction of the inner and outer clutch pistons in defining one wall of the pressure chamber so as to prevent the actuating fluid from flowing out of the chamber as the latter is being pressurized during clutch egagement.

These and other objects and advantages of the present invention will become more apparent from the following detailed description which taken in conjunction with the accompanying drawings.

DETAILED DESCRIPTION OF THE PREFERRED EMBODIMENT

Figure 1:
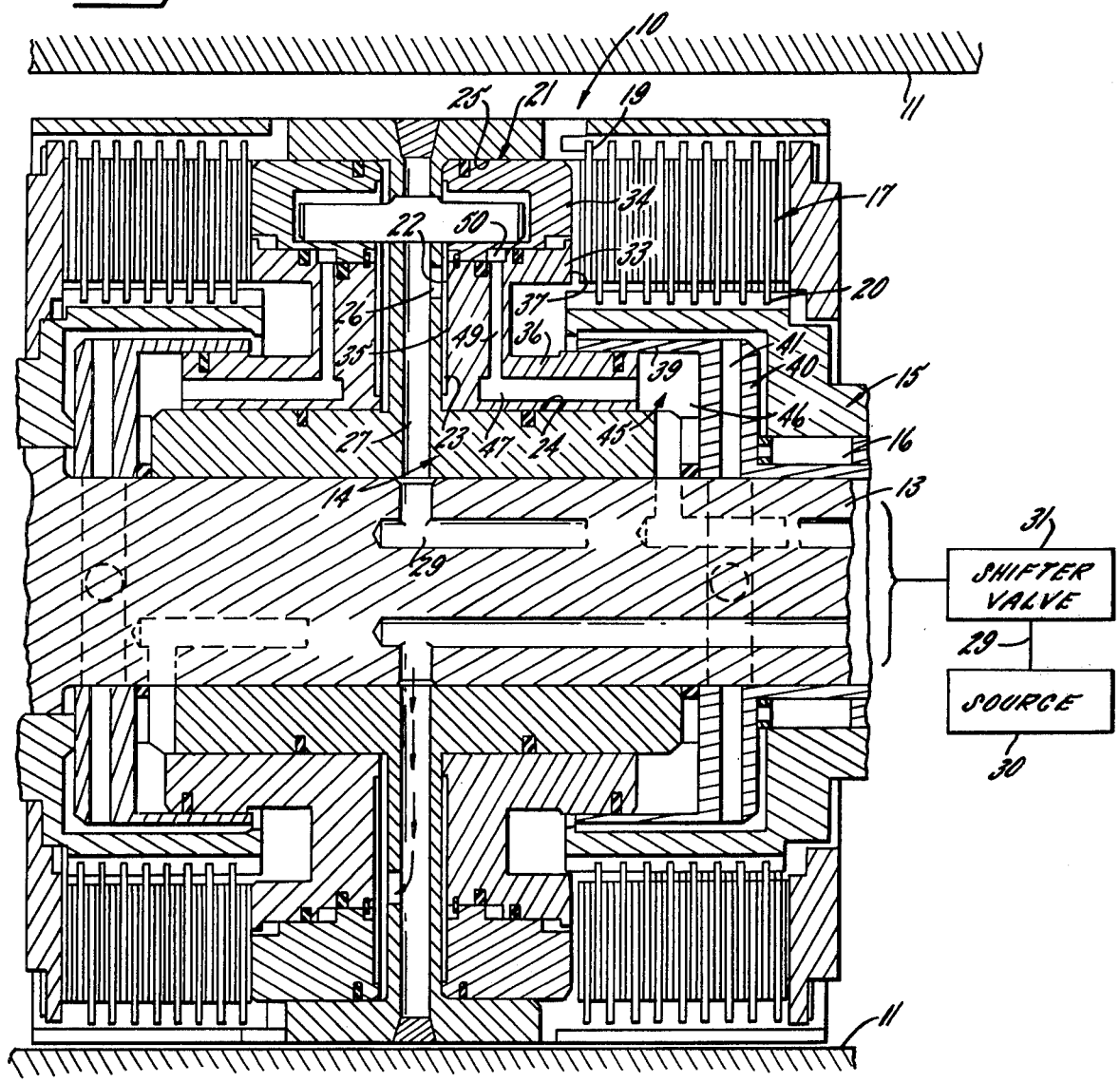
FIG. 1 is a fragmentary, cross-sectional view of a clutch assembly embodying the novel features of the present invention.

As shown in the drawings for purposes of illustration, the present invention is embodied in a fluid pressure actuated clutch assembly 10 particularly suited for use in power shifting between the gears of a transmission such as may be found in large, heavy-duty equipment. Herein, two of the assemblies are mounted within a housing 11 on a shaft 13 rotatable within the housing. The two clutch assemblies are of substantially the same construction and function in essentially the same way. Accordingly, only one of the assemblies will be described in detail, it being appreciated that such description applies equally well to the other assembly.

With reference to FIG. 1, the clutch assembly 10 includes an annular driving member 14 fixed on the shaft 13 so as to rotate with the shaft in the housing. An annular driven member 15 is journaled on the shaft by bearings 16 and may be coupled and uncoupled with the driving member by suitable means in the form of a clutch pack 17. The latter is mounted within the housing between the two members and includes a series of slightly cupped, ring-shaped friction plates 19 and 20 which, respectively, are secured to the driving and driven members. When the clutch pack is compressed by pressing the plates axially together, a frictional torque-transmitting coupling is formed between the plates thereby locking the driving and driven members to rotate together with the shaft.

To compress the clutch pack 17, an annular clutch plate 21 is mounted within the housing 11 on the driving member 14 for movement from a retracted position into an advanced position for engagement with the end plate 19 in the clutch pack. More particularly, the clutch plate is telescoped onto the driving member and into a main pressure chamber 22 for movement within the chamber between the advanced and retracted position. Herein, this pressure chamber is formed within the driving member and is defined by a rearward wall 23 extending in a generally radial direction outwardly from the shaft 13 and two radially spaced side walls 24 and 25 extending in an axial direction forwardly from the rearward wall. Advancement of the clutch plate within the chamber is achieved by introducing a noncompressible, pressurized fluid into the chamber through a port 26 formed through the rearward wall. The port opens into a passage 27 communicating through a line 29 to a suitable source 30 for supplying the pressure fluid to the chamber. A shifter valve 31 connected in the line between the source and the chamber 22 is utilized to selectively direct fluid to or vent the fluid from the chamber for engagement and disengagement of the clutch plate 21 with the clutch pack 17.

In accordance with the primary aspect to the present invention, the clutch assembly 10 is constructed in a novel manner whereby the transition from clutch disengagement to engagement is completed smoothly without imparting a sudden and jarring shock to the driveline connecting with the transmission even under opposite extremes of operating conditions of the assembly and regardless of changes in the viscosity or other operating characteristics of the pressure fluid. For these purposes, the clutch plate 21 comprises inner and outer pistons 33 and 34 movable within the main chamber 22 to compress the clutch pack 17 in stages and thereby avoid sudden and jarring clutch engagement. As the pistons are advanced from their retracted positions in the chamber, pressure means resist movement of the pistons so that one of the pistons is urged toward its retracted position with a predetermined force less than the force with which the other piston is urged toward its retracted position. As a result, in the transition from clutch disengagement to full clutch engagement, the one piston applies a partial actuating force to the clutch pack before the other piston is advanced fully to completely compress the pack and thereby develop full clutch engagement. Advantageously, means including a moveable end wall 35 of the main chamber and defined by the two pistons prevent the pressure fluid from flowing out of the chamber as the latter is being filled regardless of the relative positions of the two pistons. By virtue of this arrangement, clutch engagement shock is essentially eliminated even at opposite temperature extremes under which the assembly may be operated because the forces compressing the clutch pack are applied over essentially the same time span regardless of changed characteristics in the flow of the fuid.

Figure 2:
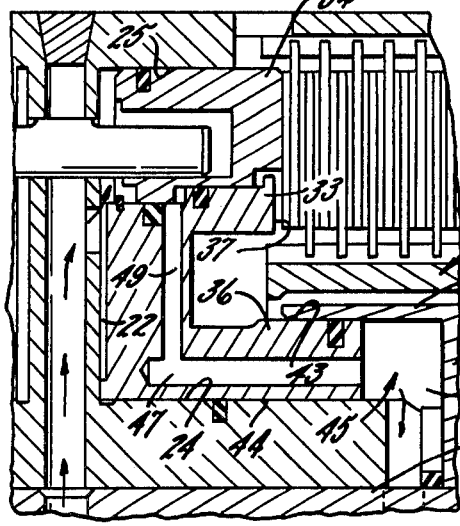
FIG. 2 is an enlarged, fragmentary, cross-sectional view similar to FIG. 1 but showing parts of the clutch assembly in moved positions in an intermediate stage of clutch engagement.

In the present instance, the inner and outer pistons 33 and 34 are annular in shape and are mounted concentric with the shaft 13 with the outer piston being telescoped onto the inner piston to slide axially with respect to the inner piston upon engagement and disengagement with the clutch pack 17. More particularly, as shown in FIG. 2, the rearward ends of the pistons are suitably recessed to aid in admitting fluid into the main chamber 22 as the fluid is initially supplied to the chamber. When filling the chamber, the outer piston 34 slides within the chamber between the outer radial wall 25 and the inner piston 33. The inner piston is provided with a enlarged annular boss 36 projecting forwardly from the working face 37 of the piston and along the inner radial wall 24 of the chamber to telescope with a rearwardly projecting flange 39. The latter is integrally formed with a bearing collar 40 which rotatably supports the driven member 15 on the shaft 13. Herein, the bearing collar is formed with a fluid passage 41 (FIG. 1) extending therethrough and through the shaft for the circulation of a cooling oil within the housing to keep the clutch pack from overheating in service use and the rearward flange 39 engages with the outer wall 43 (see FIG. 2) of the piston boss to seal the inner wall 44 of the boss from the the cooling oil.

As the chamber 22 is filled with pressurized fluid, movement of the pistons 33 and 34 is resisted by the aforementioned pressure means which, herein, is in the form of fluid spring 45 acting against both pistons. Preferably, the force applied by the spring against the outer piston 34 is less than the force applied by the spring against the inner piston 33 so that the chamber pressure forces the outer piston to slide in an outward direction on the inner piston and into engagement with the clutch pack 17 so as to partially compress the pack and thereby provide a slipping drive engagement between the driving and driven members 14 and 17 of the assembly 10.

As shown in FIGS. 1 and 2, the fluid spring 45 comprises an annular return pressure chamber 46 formed between the bearing collar 40 and the forward end of the piston boss 36. Fluid is maintained within the return pressure chamber at a constant magnitude of pressure and, thus, the force exerted by the pressure fluid against forward axial movement of the inner piston 33 is related directly to the surface area of such piston. To resist axial movement of the outer piston 34, a passage 47 extending rearwardly through the boss of the inner piston connects with a radial passage 49 leading to a smaller return pressure chamber 50 (see FIG. 3) located between the inner and outer pistons 33 and 34. A working wall 51 of this chamber is defined by a radial shoulder formed on the inner piston and a rearward working wall 53 is defined by a similar shoulder formed in the outer piston. Herein, the surface area of these two working walls is substantially less than the surface area of the working wall 54 of the larger return pressure chamber 46. Accordingly, while the magnitude of the pressure in the two return chambers 46 and 50 is equal during normal operation of the clutch assembly 10, the return force applied to the outer piston 34 from the smaller chamber 50 is considerably less than the return force which is applied to the inner piston 33. The magnitudes of both of these forces are, of course, substantially less than the magnitude of the actuating force applied to move the pistons by pressurization of the main chamber 22. Accordingly, when the pressure in the main chamber exceeds the pressure in the smaller return chamber, the outer piston advances with respect to the inner piston until the smaller chamber is substantially closed and the forward end portion 55 of the outer piston extends axially beyond the working face 37 of the inner piston 33 and engages the clutch pack 17 partially compressing it.

Advantageously, the force applied by the outer piston 34 to the clutch pack 17 is such as to create a slipping drive between the driving member 14 and the driven member 15 so as to avoid sudden, full engagement between the friction disks 19 and 20 of the clutch pack and a jarring shock to the driveline. Continued pressurization of the main chamber 22 causes the inner piston 33 to them move beneath the outer piston and into pressing engagement with the clutch pack to complete the frictional coupling between the driving and driven members.

In the operation of the exemplary clutch assembly 10, it is desirable that the length of time from initial clutch engagement to full clutch engagement be kept long enough to avoid excessive clutch slippage such as by means of two or more of the telescoping pistons 33 and 34 and, also, and more importantly, to keep this time the same for all conditions under which the assembly may be operated so as to avoid clutch shock even at opposite temperature extremes of operating conditions. With prior clutch assembly arrangements such as the one disclosed in Honda U.S. Pat. No. 3,612,237, the length of time of the transition from clutch disengagement to clutch engagement has been extended to avoid clutch shock by metering the flow of fluid into the main pressure chamber. Such an arrangement produces two problems, one from a manufacturing standpoint and the other from an operational aspect. In order to obtain equal action for each such arrangement manufactured, special and very precise machining is required of the parts of the clutch arrangement which meter the flow of fluid into the main pressure chamber. This, of course, increases the cost of such clutch arrangements. More importantly, however, because of the extreme variations of the condition under which clutch assemblies are likely to be operated and which affect the viscosity of the pressure fluid, the amount of fluid metered into the chamber may differ substantially from one temperature extreme to another. As a result, the length of time between clutch disengagement and full clutch enagement may vary to the extent that at one extreme the clutch slips excessively and, at the other extreme, there is insufficient slippage, causing clutch engagement shock.

Figure 3:
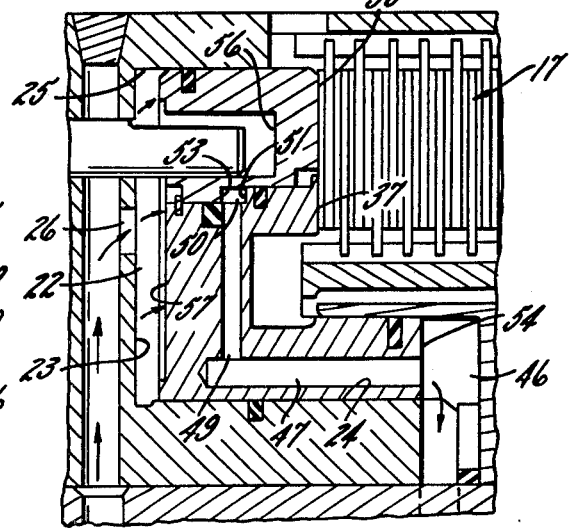
FIG. 3 is a view similar to FIG. 2 but showing parts of the assembly in additional moved positions to complete clutch engagement.

Advantageously, the transition time of clutch engagement is kept virtually the same for all operating conditions for the exemplary clutch assembly 10 by constructing the two pistons 33 and 34 to define the movable end wall 35 of the main chamber 22 so that the pressure fluid is prevented from flowing out of the chamber as it is being filled. As shown in FIG. 3, the outer piston 34 defines an outer radial portion 56 of the end wall 35 and the inner piston 33 defines an inner radial portion 57 of the wall. The pistons are sealed between each other and, also, between themselves and the adjacent fixed walls 24 and 25 of the chamber thereby leaving the port 26 as both the only entry and exit for the fluid in the main pressure chamber. By virtue of this arrangement, the transition time from clutch disenagement to full clutch engagement is kept virtually the same even at opposite extremes of operating conditions for the volume of fluid required to actuate the clutch remains the same at such extremes regardless of the viscosity of the fluid. Moreover, the rate at which the fluid is pumped into the chamber is relatively unaffected by changes in the viscosity of the fluid. Accordingly, even if the viscosity of the fluid changes as a result of operating conditions of the assembly, the time span from clutch disengagement to clutch engagement remains virtually the same.

Thus, it is seen from the forgoing, that the present invention brings to the art a new and improved clutch assembly 10 wherein clutch engagement shock is eliminated even at the extremes of operations and regardless of changes in the viscosity of the pressure fluid. In achieving this end, the clutch plate pistons 33 and 34 define means in the form of a movable end wall 35 of the main pressure chamber 22 whereby the fluid is kept from flowing out of the chamber as it is being filled instead of the fluid being metered or trimmed as it flows into the chamber. Accordingly, the volume of fluid required to fill the chamber is independent of the viscosity of the fluid. Moreover, the transition time from clutch disengagement to clutch engagement is extended to cushion clutch engagement shock, such time, however, remians virtually the same under different operating conditions for cushioning the shock even at extremes of conditions.

I claim as my invention:

1. A fluid pressure actuated clutch assembly including driving and driven members, means for releasably coupling said driving member with said driven member so that two members move together, a fluid pressure chamber associated with one of said members, source means for supplying pressure fluid to said chamber, means for selectively establishing communication between said source means and said chamber, first and second pistons telescoped into said chamber and each being movable therein between an advanced position applying an actuating force to said releasable coupling means to couple said driving and driven members together and a retracted position releasing the coupling between said members, said first piston being movable within said chamber relative to said second piston, pressure means for acting on said pistons, said pressure means including a first return pressure chamber located between said first and second pistons, a second return pressure chamber associated with said second piston, and means for supplying fluid to said return chambers at substantially constant pressures regardless of the volume of such return chambers and thereby urging said pistons toward their retracted positions within said fluid pressure chamber, said pressure means urging said first piston toward its retracted position with a predetermined force less than the force with which said pressure means urges said second piston toward its retracted position, and means including a movable end wall of said chamber defined by said two pistons and preventing fluid from flowing out of said chamber as the latter is being filled regardless of the relative positions of said pistons with respect to each other and whereby the application of actuation forces to the coupling means by the pistons remains substantially the same under different conditions of in service use for the assembly so as to avoid clutch engagement shock regardless of changing characteristics of the pressure fluid due to different operating conditions.

2. A fluid pressure actuated clutch assembly as defined by claim 1 wherein said pressure means further includes a passage communicating between said first and second return chambers whereby the pressurization of the fluid in such chambers is substantially the same.

3. A fluid pressure actuated clutch assembly as defined by claim 1 with said first piston having a surface of a predetermined area defining the working wall of said first return chamber, said second piston having a surface of an area larger than said predetermined area and defining the working wall of said second return chamber whereby the return froce applied to said first piston is less than the return force applied to said second piston by the pressurized fluid in said first and second return pressure chambers.

4. A fluid pressure actuated clutch assembly including a housing, rotatable driving and driven members mounted within said housing, a compressible clutch pack mounted within said housing 10 couple said driving member frictionally with said driven member when compressed, a fluid pressure chamber located within said housing, means for selectively supplying pressure fluid to said chamber, first and second relatively movable pistons telescoped into said chamber and being slidable therein between advanced positions actuating said clutch pack and retracted positions out of engagement with said clutch pack in response to filling and emptying said chamber with said fluid, fluid spring return means connected to and urging said first and second pistons, respectively, into their retracted positons with relative forces of lesser and greater magnitudes so that, as said chamber is pressurized, said first piston engages said clutch pack with a partial actuating force before said second piston engages said clutch pack to complete actuation thereof, and wall means within said pressure chamber defined by said pistons and for preventing fluid from flowing out of said chamber as the latter is being pressurized whereby the actuating forces applied to said clutch pack by said pistons remain substantially the same under different operating conditions regardless of variations in the characteristics of the pressure fluid resulting from such different conditions.

* * * * *